(12) United States Patent
Waterhouse et al.

(10) Patent No.: US 7,646,301 B2
(45) Date of Patent: Jan. 12, 2010

(54) AUDITABLE SECURITY FOR CARGO CONTAINERS AND OTHER REPOSITORIES

(75) Inventors: Paul Waterhouse, Selkirk (CA); Jason August, Toronto (CA); John K Stevens, Stratham, NH (US)

(73) Assignee: Visible Assets, Inc., Mississauga, Ontario (CA)

( * ) Notice: Subject to any disclaimer, the term of this patent is extended or adjusted under 35 U.S.C. 154(b) by 418 days.

(21) Appl. No.: 11/275,029

(22) Filed: Dec. 3, 2005

(65) Prior Publication Data

US 2006/0164232 A1    Jul. 27, 2006

Related U.S. Application Data

(63) Continuation of application No. 11/053,307, filed on Feb. 8, 2005, and a continuation-in-part of application No. 10/820,366, filed on Apr. 8, 2004, now Pat. No. 7,049,963.

(60) Provisional application No. 60/627,984, filed on Nov. 15, 2004, provisional application No. 60/613,767, filed on Sep. 28, 2004, provisional application No. 60/589,524, filed on Jul. 20, 2004, provisional application No. 60/561,452, filed on Apr. 12, 2004, provisional application No. 60/542,952, filed on Feb. 9, 2004, provisional application No. 60/461,562, filed on Apr. 9, 2003.

(51) Int. Cl.
*G08B 13/14* (2006.01)

(52) U.S. Cl. ............... 340/572.1; 340/539.1; 340/10.1; 340/506

(58) Field of Classification Search ............... 340/10.1, 340/506, 541, 539.1, 539.13, 571, 572.4, 340/438, 439, 442, 10.3; 705/28; 455/41.2; 701/23, 32, 33

See application file for complete search history.

(56) References Cited

U.S. PATENT DOCUMENTS

| 4,750,197 | A | * | 6/1988 | Denekamp et al. ........ 455/404.2 |
| 4,792,796 | A | | 12/1988 | Bradshaw et al. |
| 4,821,291 | A | | 4/1989 | Stevens et al. |
| 4,879,756 | A | | 11/1989 | Stevens et al. |
| 4,937,586 | A | | 6/1990 | Stevens et al. |
| 5,177,432 | A | | 1/1993 | Waterhouse et al. |
| 5,245,534 | A | | 9/1993 | Waterhouse et al. |
| 5,260,694 | A | | 11/1993 | Remahl |
| 5,374,815 | A | | 12/1994 | Waterhouse et al. |
| 5,447,055 | A | * | 9/1995 | Thompson et al. ........... 73/49.2 |
| 5,532,465 | A | | 7/1996 | Waterhouse et al. |
| 6,745,027 | B2 | * | 6/2004 | Twitchell, Jr. ............ 455/422.1 |
| 7,028,861 | B2 | | 4/2006 | Sayers et al. |
| 7,049,963 | B2 | | 5/2006 | Waterhouse et al. |
| 7,089,099 | B2 | * | 8/2006 | Shostak et al. ................ 701/32 |
| 7,161,476 | B2 | * | 1/2007 | Hardman et al. ............ 340/442 |

(Continued)

*Primary Examiner*—Davetta W Goins
*Assistant Examiner*—Hoi C Lau
(74) *Attorney, Agent, or Firm*—Larson & Anderson, LLC

(57) ABSTRACT

This invention relates to a method and system for authenticating and for preventing alteration of histories of events occurring within at least one repository (e.g. a cargo container, fixed warehouse or a movable vehicle) for objects (e.g. auto parts, pharmaceutical materials, computer parts, laptops, etc.) held for a period of time, where the repository is exposed to an unauthorized intrusion therewithin (and potential theft of said objects therefrom and potential insertion of dangerous items therewithin). The events include changes in environmental conditions (e.g. light levels, infrared levels, temperature, air pressure, etc) which indicate an unauthorized intrusion.

26 Claims, 12 Drawing Sheets

U.S. PATENT DOCUMENTS

| | | |
|---|---|---|
| 2003/0122670 A1* | 7/2003 | Stern et al. ............... 340/568.1 |
| 2003/0189491 A1* | 10/2003 | Ng ......................... 340/572.9 |
| 2004/0053641 A1 | 3/2004 | Leung et al. |
| 2004/0069849 A1 | 4/2004 | Stevens et al. |
| 2004/0113783 A1* | 6/2004 | Yagesh .................... 340/568.1 |
| 2004/0149822 A1 | 8/2004 | Stevens et al. |
| 2004/0178880 A1* | 9/2004 | Meyer et al. ............... 340/5.22 |
| 2004/0205350 A1 | 10/2004 | Waterhouse et al. |
| 2004/0233054 A1* | 11/2004 | Neff et al. ................ 340/539.1 |
| 2005/0029345 A1 | 2/2005 | Waterhouse et al. |
| 2005/0043850 A1 | 2/2005 | Stevens et al. |
| 2005/0043886 A1 | 2/2005 | Stevens et al. |
| 2005/0046567 A1* | 3/2005 | Mortenson et al. ...... 340/539.13 |
| 2005/0073406 A1* | 4/2005 | Easley et al. .............. 340/539.1 |
| 2005/0083213 A1 | 4/2005 | Stevens et al. |
| 2005/0086983 A1 | 4/2005 | Stevens et al. |
| 2005/0149226 A1 | 7/2005 | Stevens et al. |
| 2005/0205817 A1 | 9/2005 | Marcichow et al. |
| 2005/0251330 A1 | 11/2005 | Waterhouse et al. |
| 2006/0124662 A1 | 6/2006 | Reynolds et al. |
| 2006/0128023 A1 | 6/2006 | Waterhouse et al. |
| 2006/0164232 A1* | 7/2006 | Waterhouse et al. ......... 340/506 |
| 2006/0164239 A1* | 7/2006 | Loda ..................... 340/539.22 |
| 2006/0220857 A1 | 10/2006 | August et al. |
| 2006/0232417 A1 | 10/2006 | August et al. |

* cited by examiner

AUDITABLE SECURITY FOR CARGO CONTAINERS AND OTHER REPOSITORIES

CROSS-REFERENCE TO RELATED APPLICATIONS

This application claims priority from U.S. application Ser. No. 11/053,307 filed Feb. 8, 2005. U.S. application Ser. No. 11/053,307 in turn claims priority from U.S. application No. 60/627,984 filed Nov. 15, 2004, and from U.S. application No. 60/613,767 filed Sep. 28, 2004, and from U.S. application No. 60/589,524 filed Jul. 20, 2004, and from U.S. application No. 60/561,452 filed Apr. 12, 2004, and from U.S. application No. 60/542,952 filed Feb. 9, 2004, all of which are incorporated by reference for all purposes. U.S. application Ser. No. 11/053,307 is a continuation-in-part of U.S. application Ser. No. 10/820,366 filed Apr. 8, 2004, which claims priority from U.S. application No. 60/461,562 filed Apr. 9, 2003, all of which are incorporated by reference for all purposes.

FIELD OF THE INVENTION

This invention relates to a method and system for authenticating the histories of events experienced by objects held in a repository (e.g. shipping container, fixed warehouse or a movable vehicle), and detecting the time and date of an unauthorized intrusion, which may entail potential theft therefrom of objects such as pharmaceutical products, auto parts, computer parts, laptop computers, etc. during storage in the repository. Moreover, such unauthorized intrusion may involve clandestine insertion of weapons, explosives, or other dangerous materials into the shipping container to enable such dangerous materials to be spirited into a target location for disastrous effect.

BACKGROUND OF THE INVENTION

Most shipments contained in trucks and shipping containers are locked via doors at the rear of the vehicle or shipping container. Typically, such shipping/cargo containers are assembled out of corrugated steel and are 8 feet wide, 8' 6" high, and 20' long, although some are as long as 40' or 45'. Often special locking devices are attached (See U.S. Pat. No. 6,364,584) and several commercially available units (e.g. the Omni SeaLock System from Omni Security Consultants, Inc. of Miami, Fla., USA) are available to attach to the two locking rods so the doors cannot be opened. In most cases, however, a simple seal with a fixed stamped number located on the front is used. These seals and numbers may be inspected by the consignee as well as customs authorities and others along the shipping route to insure that the freight is intact and has not been touched since it was shipped.

These systems however do not prevent the removal of freight by cutting a hole in the side or rear of a container to gain access. In many cases this hole can be sealed and painted over, and then it appears as if it were a simple authorized repair. Selected objects may be removed from the container with the seal and lock still intact. It is estimated that over $50 billion worth of freight is stolen each year and most of this occurs with security seals intact. In addition security issues associated with September, 11 attacks have created concerns that dangerous materials (e.g. explosives, biological contaminants) useful to terrorists may be placed inside a truck or container and smuggled undetected into a target location.

It is an object of the present invention to provide a system that dramatically reduces costs and makes possible real-time tracking of events, with the ability to log and detect openings and closings of repositories such as containers or trucks in near real-time, thus providing records and proof that a container or truck has been sealed since it was shipped. In addition the system is capable of providing an independent audit trial that goods were untouched within the container. As will be understood, such an audit trail is very valuable. for example, the exact time of an intrusion is important in assigning liability for insurance claims based upon theft and in determining reponsibility therefor.

This invention is related to to the system described in previous provisional U.S. application 60/515,074, filed Oct. 28, 2003, for authenticating temperature histories of objects such as pharmaceuticals. However, as will be understood based upon the present application, the present invention is implemented by real-time tracking and auditable logging of events (such as light levels, via a small photo detector) within repositories such as shipping containers, warehouses, as well as trucks, on a routine basis and for virtually every object contained in the repository to detect and unalterably record unauthorized intrusions into the shipping container or other repository. An important object of such unalterable recording is to authenticate the history of events within a cargo container or other receptacle and to immediately notify security personnel or government authorities (for example, by wireless transmission to satellites, whereby worldwide tracking of detected unauthorized intrusions can be achieved).

SUMMARY OF THE INVENTION

The present invention broadly provides a method for preventing alteration of histories of events occurring within at least one repository (e.g. a cargo container, fixed warehouse or a movable vehicle) for objects (e.g. autoparts, pharmaceutical materials, computer parts, laptops, etc.) held for a period of time, the aforesaid repository being exposed to an unauthorized intrusion therewithin (and potential theft of the objects therefrom and potential insertion of dangerous items therewithin), the aforesaid events comprising changes in environmental conditions (e.g. light levels, infrared levels, temperature, air pressure, etc) which indicate an the aforesaid unauthorized intrusion, the the aforesaid method comprising:

a) sensing an the aforesaid event occurring within said repository;

b) recording an event signal that defines the sensed event;

c) transmitting a temporally ordered series of the aforesaid event signals to a data storage apparatus, said data storage apparatus being operable to store the aforesaid temporally ordered series of the aforesaid event signals; and d) safeguarding the aforesaid data storage apparatus against alteration of the aforesaid stored series of event signals.

According to a preferred embodiment of the invention, safeguarding step (d) is carried out by selecting a data storage apparatus which is operable to store the aforesaid series of event signals upon a medium that cannot be readily altered without detection. Preferably, the repository is a cargo container on vehicle such as a truck, ship, or rail car, and the medium is a write-once-only CD-Recordable (CD-R) disc.

Advantageously, safeguarding step (d) may be carried out by disposing said data storage apparatus at a secure location (e.g. KPMG or other auditor's offices) distant from the cargo container or other repository.

According to an embodiment of the invention, safeguarding step (d) utilizes a selected algorithm to calculate a pair of checksums based on a selected sequence of event signals, the aforesaid pair of checksums having a selected relationship (e.g. being identical) in the event of data integrity, one of the aforesaid checksums being calculated from event signals generated at the repository (e.g. at a cargo container or at a sea vessel carrying many cargo containers), the other checksum being calculated from event signals transmitted to said data storage apparatus.

Preferably, transmitting step (c) is carried out by transmitting the aforesaid event signals to the data storage apparatus immediately upon recording thereof (i.e. in real time) in accordance with step (b).

Desirably, safeguarding step (d) may also comprise storage of corresponding temporal (e.g. date/time) data together with each said event signal, said temporal data being obtained from an independent source (e.g. National Institute of Standards and Technology (NIST) or a global positioning system (GPS) satellite). Of course, location data from the GPS satellite may also be included to help track the position of the cargo container.

Preferably, the aforesaid sensing step (a) and recording step (b) are carried out by associating (e.g. attaching to) a tag with a repository, the aforesaid tag comprising an event sensor operable to record an event signal for describing an event (e.g. change in light or infrared level) occurring within a repository (e.g. cargo container), a data storage device operable to store data comprising identification data for identifying the aforesaid radio frequency tag, the tag being operable to provide data signals comprising the aforesaid event signal and an identification signal based upon the aforesaid identification data, and an energy source for activating said event sensor and said data storage device.

Preferably, sensing step (a) and recording step (b) are carried out by associating (e.g. attaching to) a tag with the cargo container, the aforesaid tag comprising an event sensor operable to record an event signal for describing a said event occurring within said cargo container, a data storage device operable to store data comprising identification data for identifying the aforesaid radio frequency tag, the aforesaid tag comprising a transmitter operable to transmit data signals comprising the aforesaid event signal and an identification signal based upon the aforesaid identification data to the aforesaid data storage apparatus, and an energy source for activating the event sensor, transmitter and data storage device.

Advantageously, the tag is attached to an outer surface of said cargo container, and wherein said event sensor comprises a photodetector disposed within said cargo container, said photodetector being operable to transmit event signals, describing a change in light (visible or infrared) levels within said cargo container based upon an unauthorized intrusion, to the aforesaid data storage device.

Moreover, a plurality of the aforesaid tags may be disposed in different areas of the aforesaid cargo container to sense different events (e.g. different light levels) experienced in such different areas.

Advantageously, a plurality of series of such data signals (comprising event signals and identification signals) from a corresponding plurality of cargo containers may be transmitted wirelessly to the aforesaid data storage apparatus via a communication network (which may include communication satellites or cellular ground stations), the aforesaid data storage apparatus being operable to store the aforesaid series of event signals upon a medium (e.g. write-once-only CD Recordable (CD-R) disc) that cannot be readily altered without detection.

For this purpose, the aforesaid tag may a radio frequency (RF) tag, said RF tag comprising a tag transmitter and a tag antenna operable at a radio frequency (preferably less than 1 megaherz, for example 300 khz)

The invention further broadly provides a system for preventing alteration of histories of events occurring within at least one repository (e.g. a cargo container, fixed warehouse or a movable vehicle) for objects (e.g. autoparts, pharmaceutical materials, computer parts, laptops, etc.) held for a period of time, the aforesaid repository being exposed to an unauthorized intrusion therewithin (and potential theft of said objects therefrom and potential insertion of dangerous items therewithin), the aforesaid events comprising changes in environmental conditions (e.g. light levels, infrared levels, temperature, air pressure, etc) which indicate an unauthorized intrusion, the aforesaid system comprising:

a) a tag carried by a the aforesaid repository, such tag comprising an event sensor operable to record an event signal for describing an aforesaid event occurring within the repository, a data storage device operable to store data comprising identification data for identifying the tag, a tag transmitter operable to transmit data signals comprising the aforesaid event signal and an identification signal based upon such identification data, and an energy source for activating the event sensor and the tag transmitter and the data storage device; and b) a data storage apparatus in operative communication with the tag, such data storage apparatus being operable to store a temporally ordered sequence of the aforesaid event signals upon a medium which cannot be readily altered without detection.

Preferably, the system comprises a central data processor, each tag being connected by cable to such central data processor.

Alternatively, the aforesaid tag comprises a radio frequency (RF) tag attached to the repository, the aforesaid system further comprising:

c) at least one field antenna disposed at an orientation and within a distance from the repository that permit effective communication with said RF tag at said radio frequency; and d) a reader in operative communication with the aforesaid field antenna, such reader being operable to receive data signals from the aforesaid RF tag.

Preferably, the aforesaid data storage apparatus is disposed at a secure location distant from said object, said system further comprising:

e) a field transmitter disposed at the repository and operable to transmit the aforesaid event signals to such data storage apparatus.

The aforesaid system comprising a pair of checking devices for utilizing a selected algorithm to calculate a corresponding pair of checksums based on a selected sequence of event signals, the pair of checksums having a selected relationship (e.g. being identical) in the event of data integrity, one of said checking devices being disposed at said repository (e.g. at said tag), the other checking device being disposed at said data storage apparatus.

Preferably, the aforesaid system further comprises:

d) a geographic position sensing (GPS) detector operable to record a location signal defining a geographic position of the aforesaid movable repository (e.g. vehicle), the aforesaid data storage apparatus being in operative communication with the aforesaid reader and the aforesaid GPS detector, such data storage apparatus being operable to store a temporally ordered sequence of the aforesaid event signals and corresponding location signals upon a medium which cannot be readily altered without detection.

The aforesaid system may further comprise a clock operable to generate time signals for transmittal to the aforesaid data storage apparatus and for storage threat in correspondence with the aforesaid event signals.

Advantageously, the aforesaid repository may comprise a cargo container disposed on a movable vehicle (e.g. shipping vessel, railway carriage), such movable vehicle further comprising a central data processor in operative communication with the aforesaid field antenna, the aforesaid tag further comprising a tag receiver operable to receive an RF interrogation signal from the aforesaid field antenna, such RF interrogation signal being operable to cause said tag to emit an event signal.

According to a preferred embodiment, the aforesaid identification data comprises an internet protocol (IP) address, and the aforesaid central data processor is operable for communication with an internet router.

The aforesaid tag may further comprise a display (e.g. LCD) operable to display visible data relating to the event sensor of said tag. Such visible data can, of course, comprise one of the aforesaid checksums.

According to a preferred embodiment, the aforesaid system comprises a plurality of said low frequency (e.g. not exceeding 300 khz) RF tags and a plurality of low frequency field antennas disposed in different areas of said movable repository and operable to enable discrimination of event signals received from RF tags disposed in different areas.

The invention also provides a method for preventing alteration of histories of events occurring within at least one repository (e.g. a cargo container, fixed warehouse or a movable vehicle) for objects (e.g. autoparts, pharmaceutical materials, computer parts, laptops, etc.) held for a period of time, said repository being exposed to an unauthorized intrusion therewithin (and potential theft of the objects therefrom and potential insertion of dangerous items therewithin), the aforesaid events comprising changes in environmental conditions (e.g. light levels, infrared levels, temperature, air pressure, etc) which indicate an unauthorized intrusion, said method comprising:

a) sensing an event occurring within the aforesaid repository upon a tag attached thereto;

b) unalterably recording an event signal that defines the sensed event upon a write-once-only data storage device (e.g. PROM) comprised by such tag;

c) transmitting a temporally ordered series of the aforesaid event signals to a data storage apparatus. the aforesaid data storage apparatus being operable to store such temporally ordered series of said event signals; and d) safeguarding the aforesaid data storage apparatus against alteration of such stored series of event signals.

The invention also provides a tag for use in preventing alteration of histories of events occurring within at least one repository (e.g. a cargo container, fixed warehouse or a movable vehicle) for objects (e.g. autoparts, pharmaceutical materials, computer parts, laptops, etc.) held for a period of time, said repository being exposed to an unauthorized intrusion therewithin (and potential theft of said objects therefrom and potential insertion of dangerous items therewithin), said events comprising changes in environmental conditions (e.g. light levels, infrared levels, temperature, air pressure, etc) which indicate a said unauthorized intrusion, said tag being adapted for association with (e.g. attachment to) said repository, said tag comprising an event sensor operable to record an event signal representative of a said event occurring within said repository, a write-once-only data storage device (e.g. PROM) operable to store, in an unalterable manner, data comprising said event signal, a tag transmitter operable to transmit data signals comprising said event signal, and an energy source for activating said event sensor and said write-once-only data storage device.

Preferably, the repository comprising a cargo container, said write-once-only data storage device being operable to store identification data for identifying said tag, said tag being adapted for attachment to an outer surface of said cargo container, said event sensor comprising a photodetector disposed within said cargo container, said photodetector being operable to transmit event signals describing a change in light levels within said cargo container, based upon an unauthorized intrusion, to said data storage device.

According to a preferred embodiment, the aforesaid photodetector is securely affixed to the tag with a connecting member through an aperture in a wall of said cargo container, such connecting member being removable only upon access thereto from within the aforesaid cargo container.

DESCRIPTION OF PREFERRED EMBODIMENTS

A preferred embodiment of the present invention provides a system that comprises a small low cost radio frequency (RF) tag as shown in FIGS. 1-5, that contains its own memory, a light sensor (e.g. a photodetector), an optional display and optional light emitting diodes.

Figure 1:
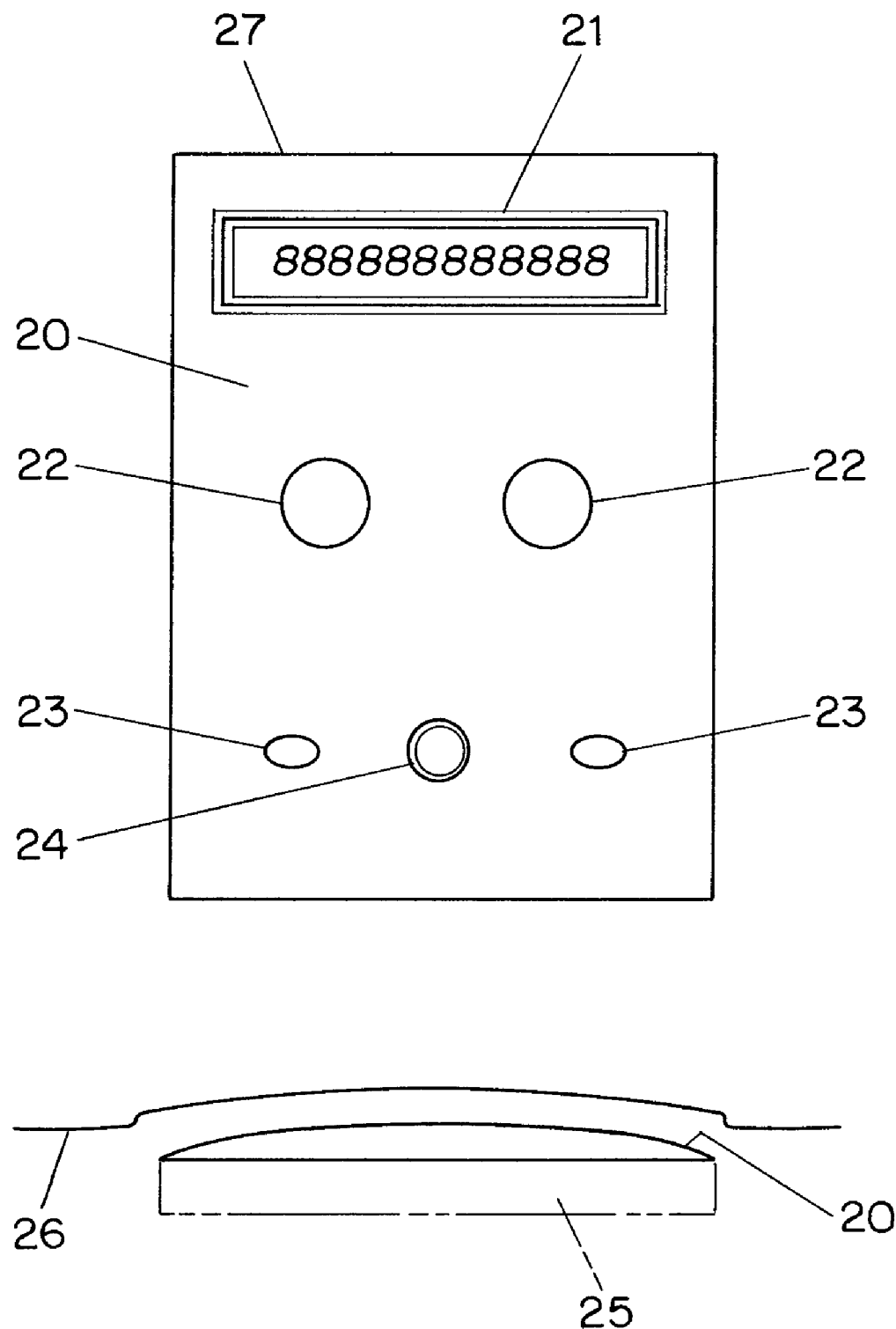
FIG. 1 shows schematic front and side views of a temperature logging tag that may be used in accordance with the present invention.
Figure 2:
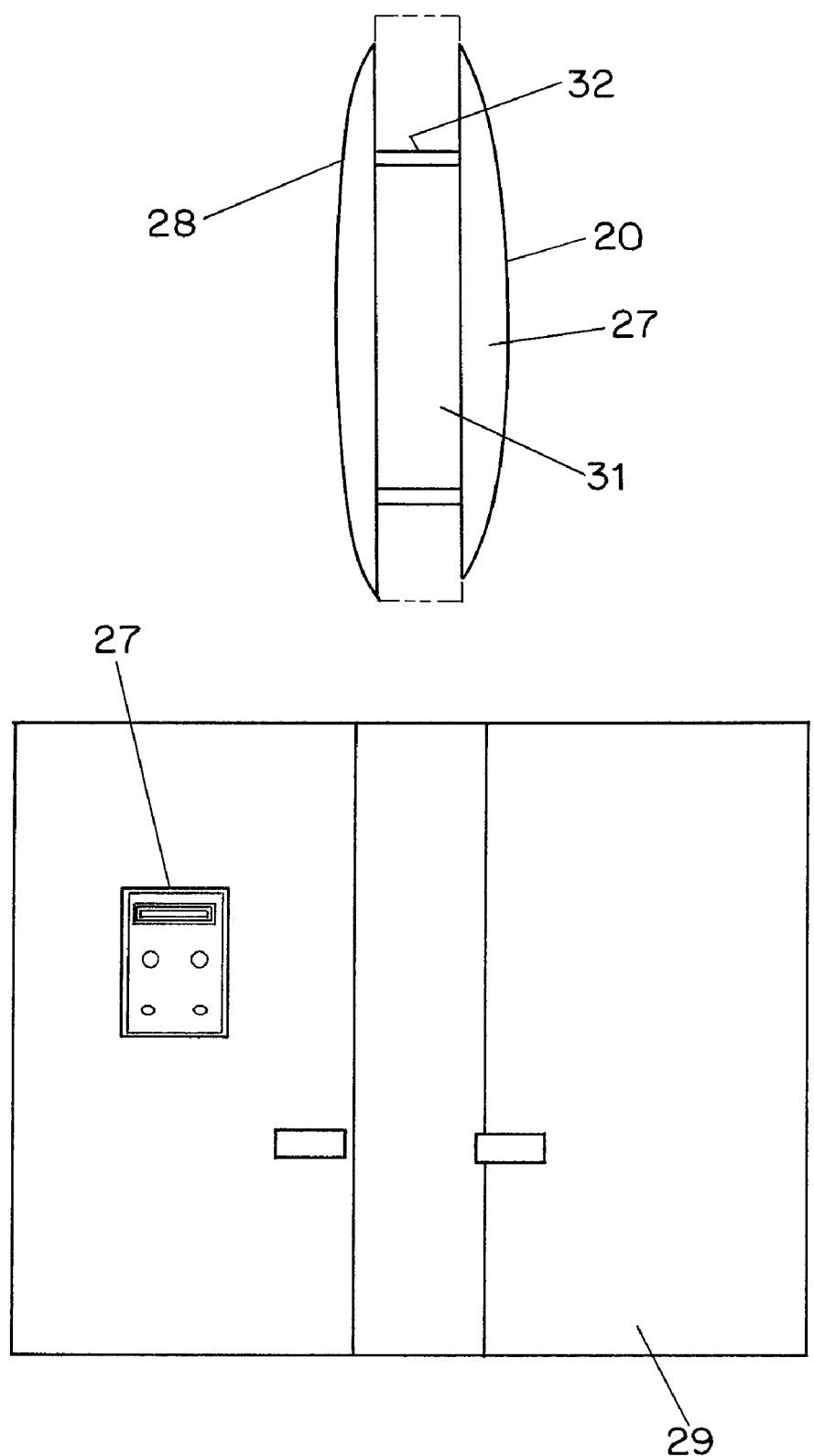
FIG. 2 shows a tag attached to an outer surface of a wall of a cargo container, with holes provided in the wall for communication with a photodetector exposied to the interior of the cargo container. The photodetector is securely affixed to the tag with at least one connecting member through an aperture in a wall of the cargo container, the connecting member being removable only upon access thereto from within the cargo container.
Figure 3:
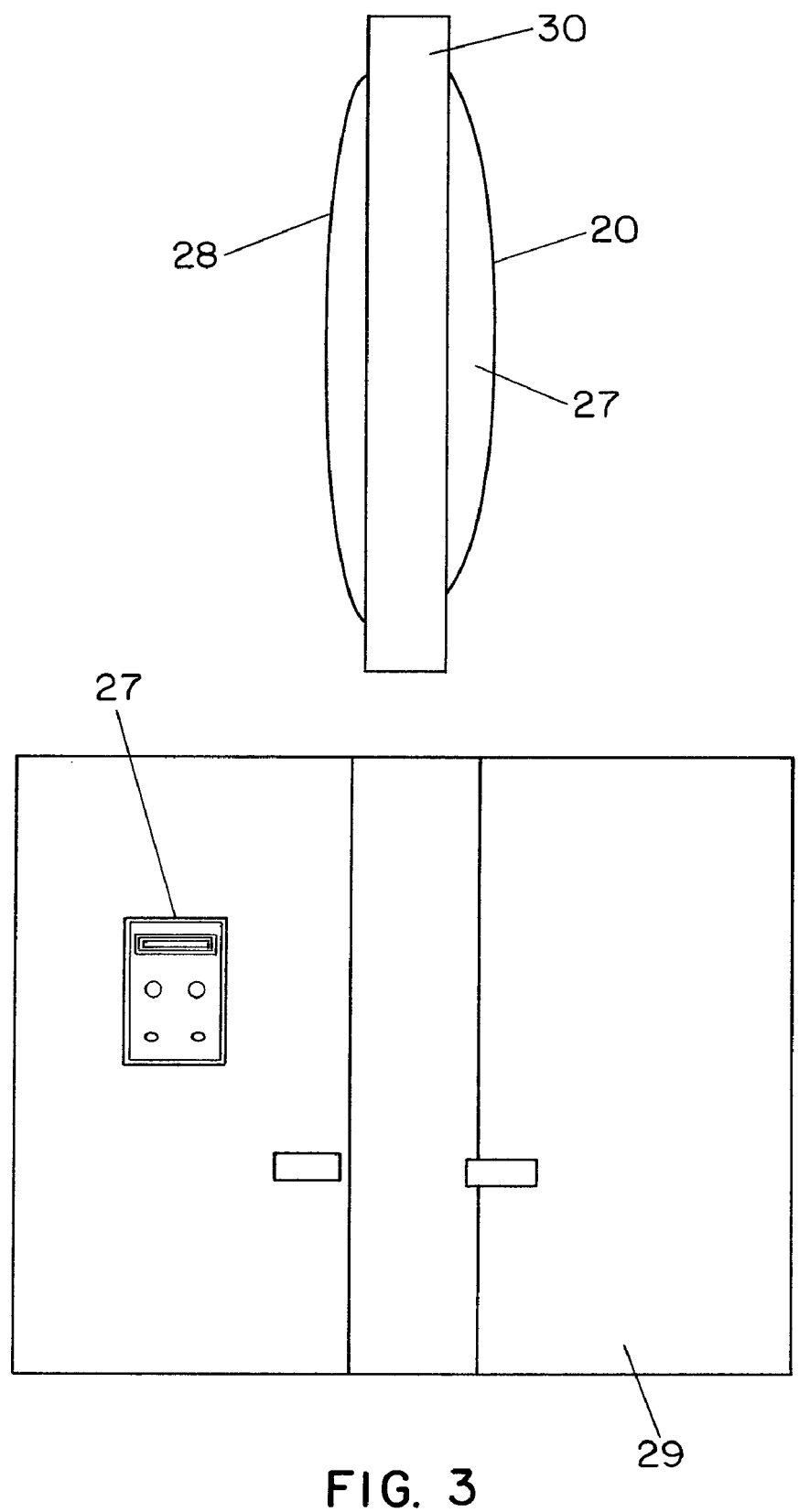
FIG. 3 shows a similar arrangement to FIG. 2, except that the tags may be attached to the wall with an adhesive, and event data signals may be transmitted through the steel wall by low frequency inductive communication.
Figure 4:
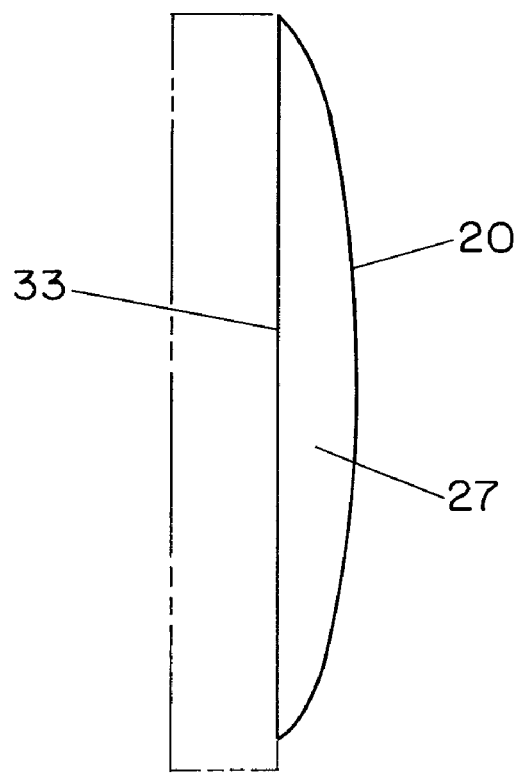
FIG. 4 schematically illustrates how individual tags may be attached directly to individual items of freight contained within the cargo container or other repository. In this case, the tags may carry data such as the manifest and destination and shipping data, as well as photodetector for sensing light levels within the repository (cargo container) within which the items are to be shipped.
Figure 4:
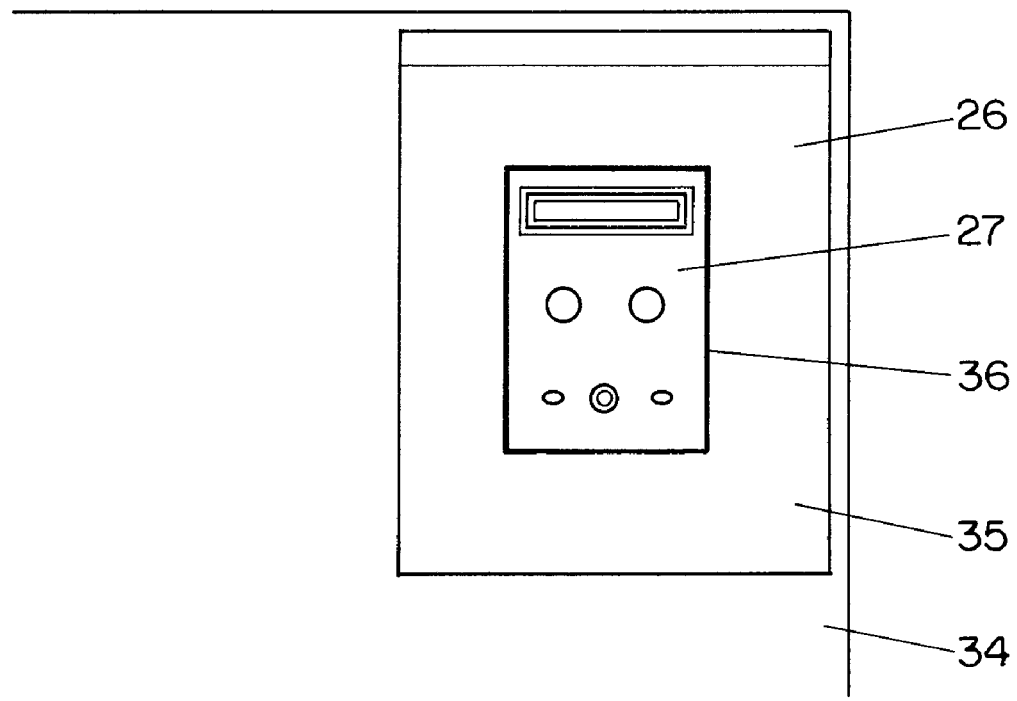
Figure 5:
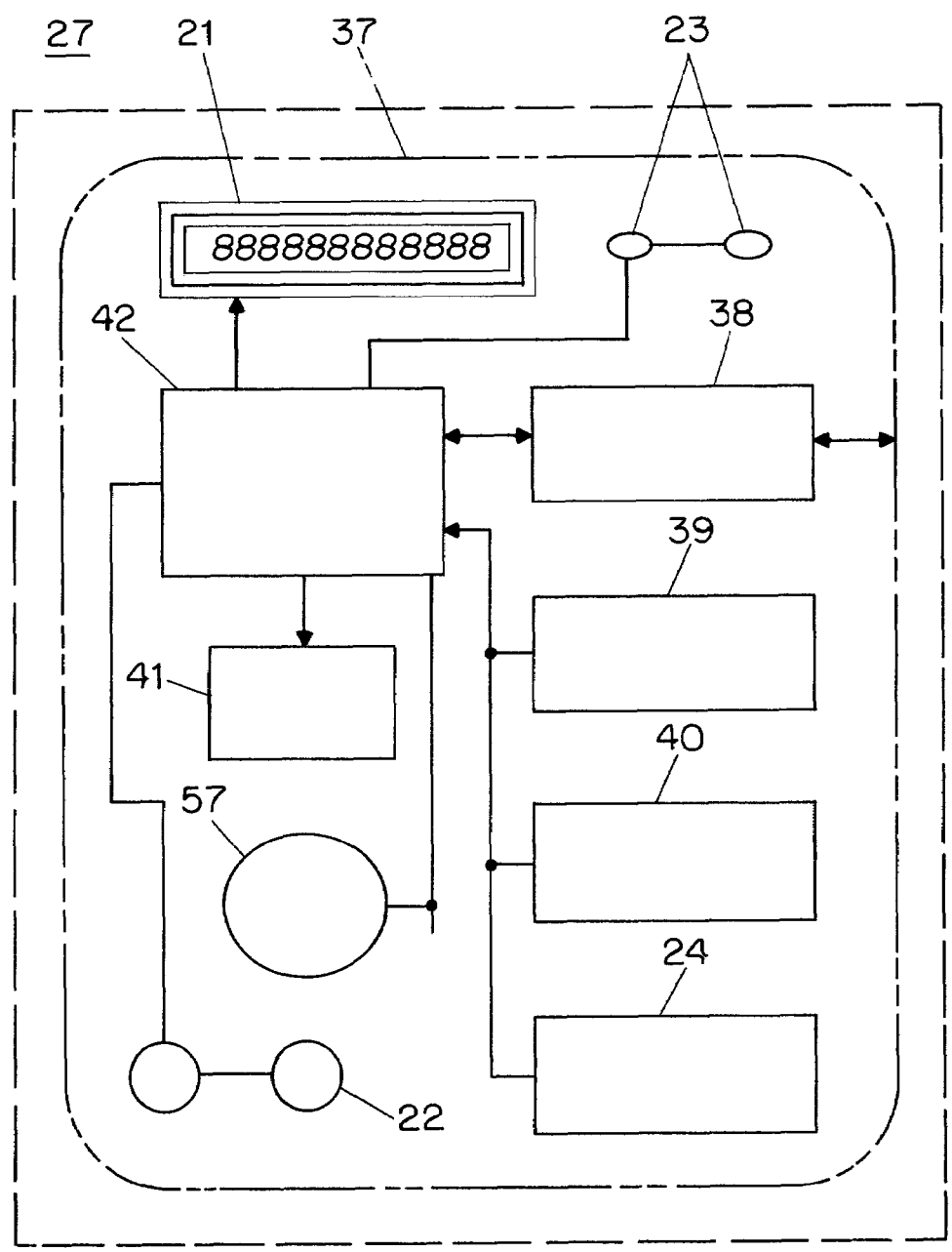
FIG. 5 shows aschematic front view of a security tag with its main components displayed, in accordance with the present invention, that transmits event data wirelessly.

As shown in FIG. 4, these tags may be placed directly on the side of the box of shipped items (e.g. autoparts) or pallet and will continuously record data including the time and light levels within a cargo container or other repository, and write this log to the internal memory of the tag. In addition, the tags may be interrogated by a radiofrequency transmitter contained in the warehouse of FIG. 6 or the truck of FIG. 7.

This radiofrequency system may be based on low-frequency (e.g. 300 khz) induction and may require large (e.g. 5' to 50' radius) loop field antennas placed in the ceiling or the floor of the truck. These loop antennas may also be used to segregate different regions of the truck or other repository to improve detection of light level changes caused by an unauthorized intrusion into the cargo container (by contrast with another, non-intruded, area of the cargo container.

Figure 6:
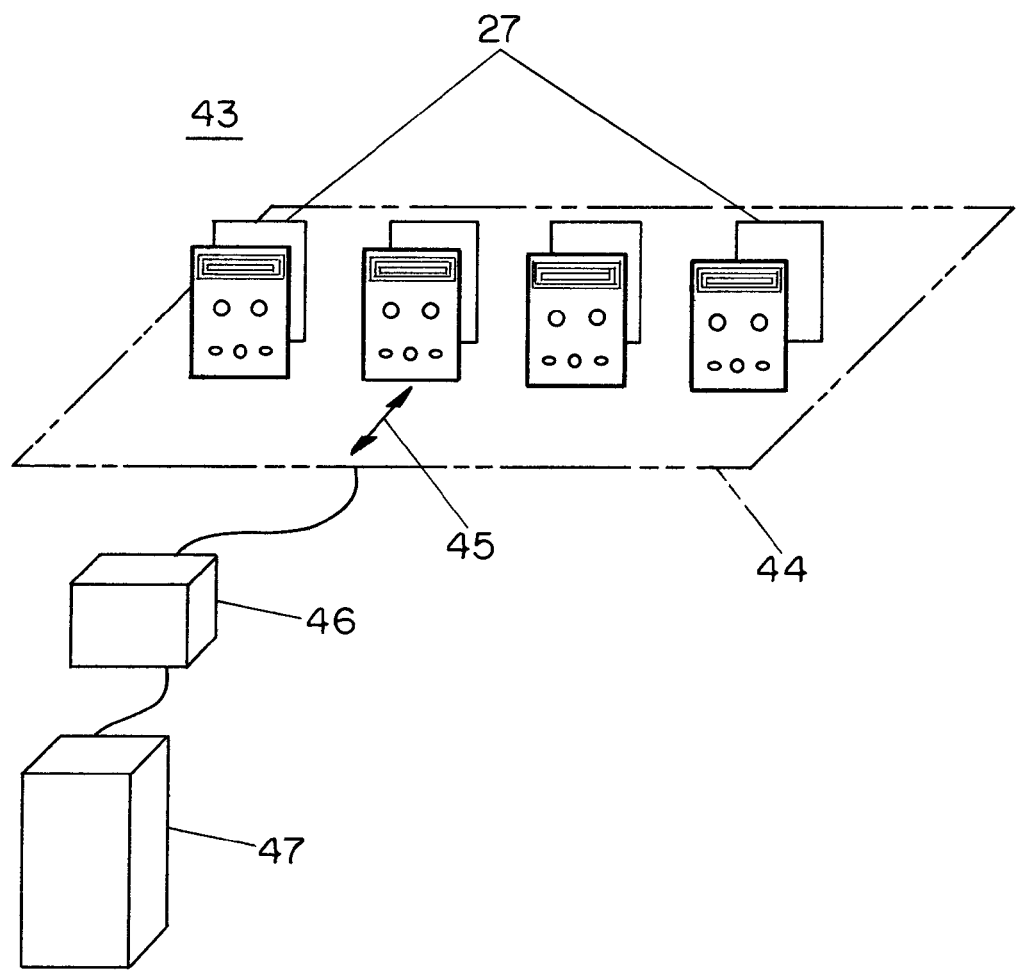
FIG. 6 is a schematic view of a warehouse, port, or ship authenticated by use of a plurality of wireless tags that may be attached to cargo containers (or indirectly by affixing the tags to shipped objects), a loop antenna, a base station and a server that transmits event data for secure recording on a local data storage system (within the server) that uses CD-R discs.
Figure 7:
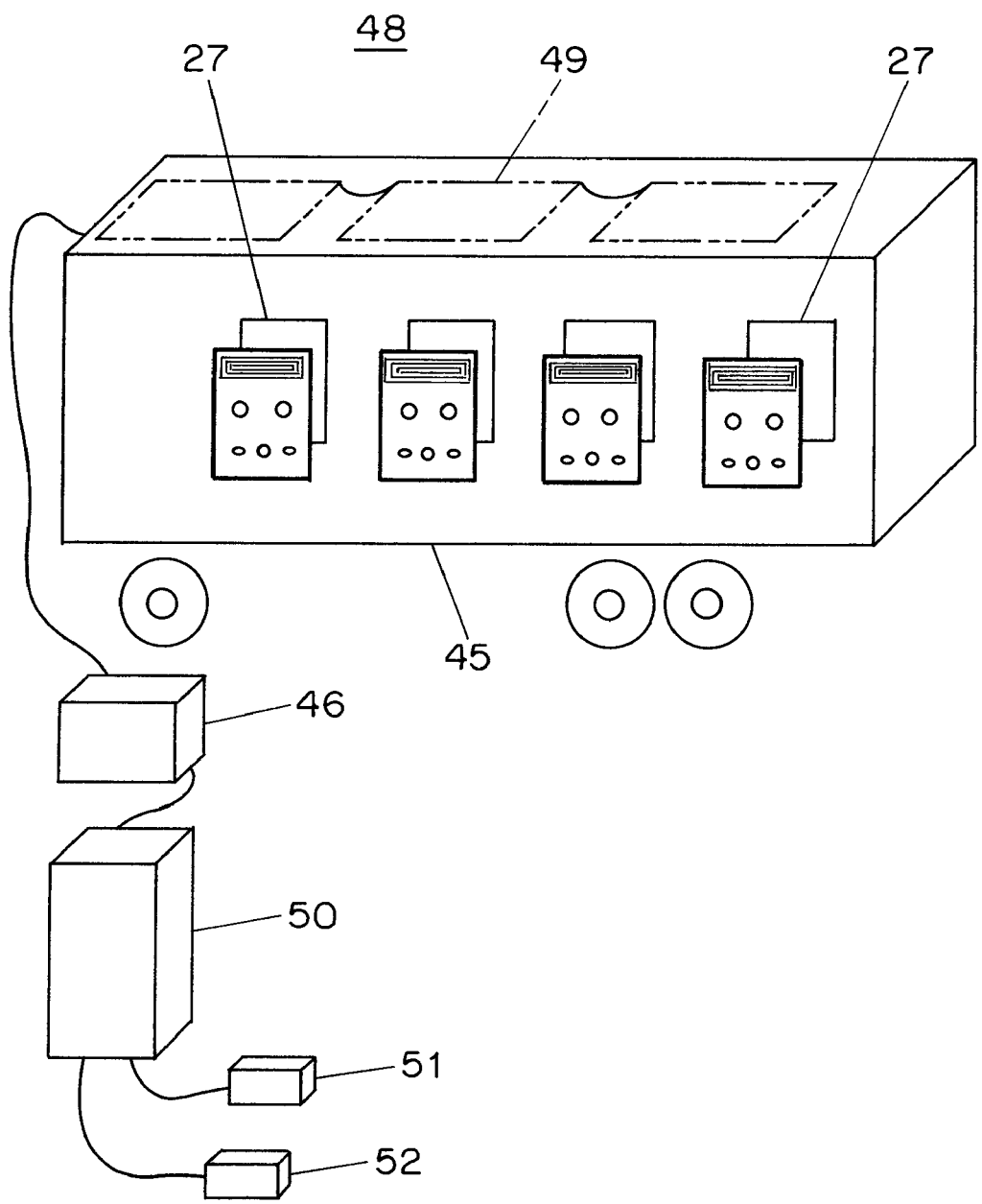
FIG. 7 is a schematic view of a vehicle (e.g. truck, shipping vessel, or railway car or cargo container) authenticated by use of a plurality of wireless tags, a loop antenna, a base station and a server that transmits event data and GPS location and time data for secure recording on a distant data storage system that uses CD-R discs.
Figure 8:
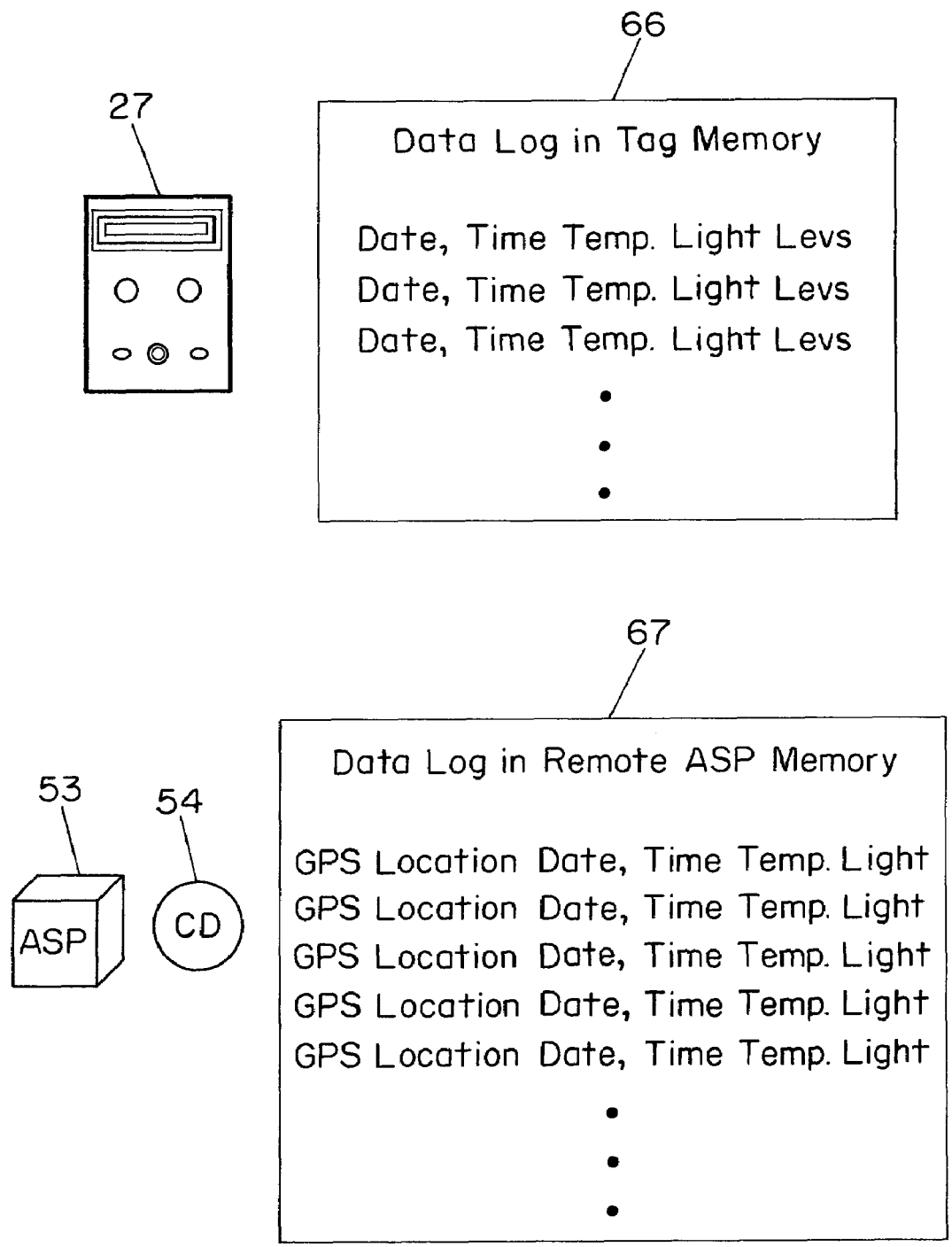
FIG. 8 is a schematic view of a tag that records event (e.g. visible or infrared light data) at the shipping package within a repository (e.g. cargo container), and of a remotely located ASP and unalterable data storage apparatus using write-once-only CD-R discs to record, in real time, the temporally ordered series of light levels and corresponding GPS locations, dates, and times of the light level events experienced at the tag.

In addition each truck or ship may be equipped with a small computer and a global positioning system (GPS) receiver. As the truck drives along the highway, the computer may interrogate, periodically, the tags in the back of the vehicle, as indicated in FIG. 6. The tags may read the current light levels and other events once a minute, once in 10 minutes, once every three hours etc. and this data may be transmitted via satellite or via cell phone periodically to a centrally located Application Services Provider (ASP). As the data are acquired at the ASP it may be displayed (see lower part of FIG. 8) on a web-enabled report in real-time with location of the truck, as determined by a GPS device carried by the truck. In addition the ASP may write the data log directly to a CD in real-time. This CD can be a write only device so the log is prominent, cannot be tampered with and has been recorded away from the truck by an independent auditor in real-time.

Figure 9:
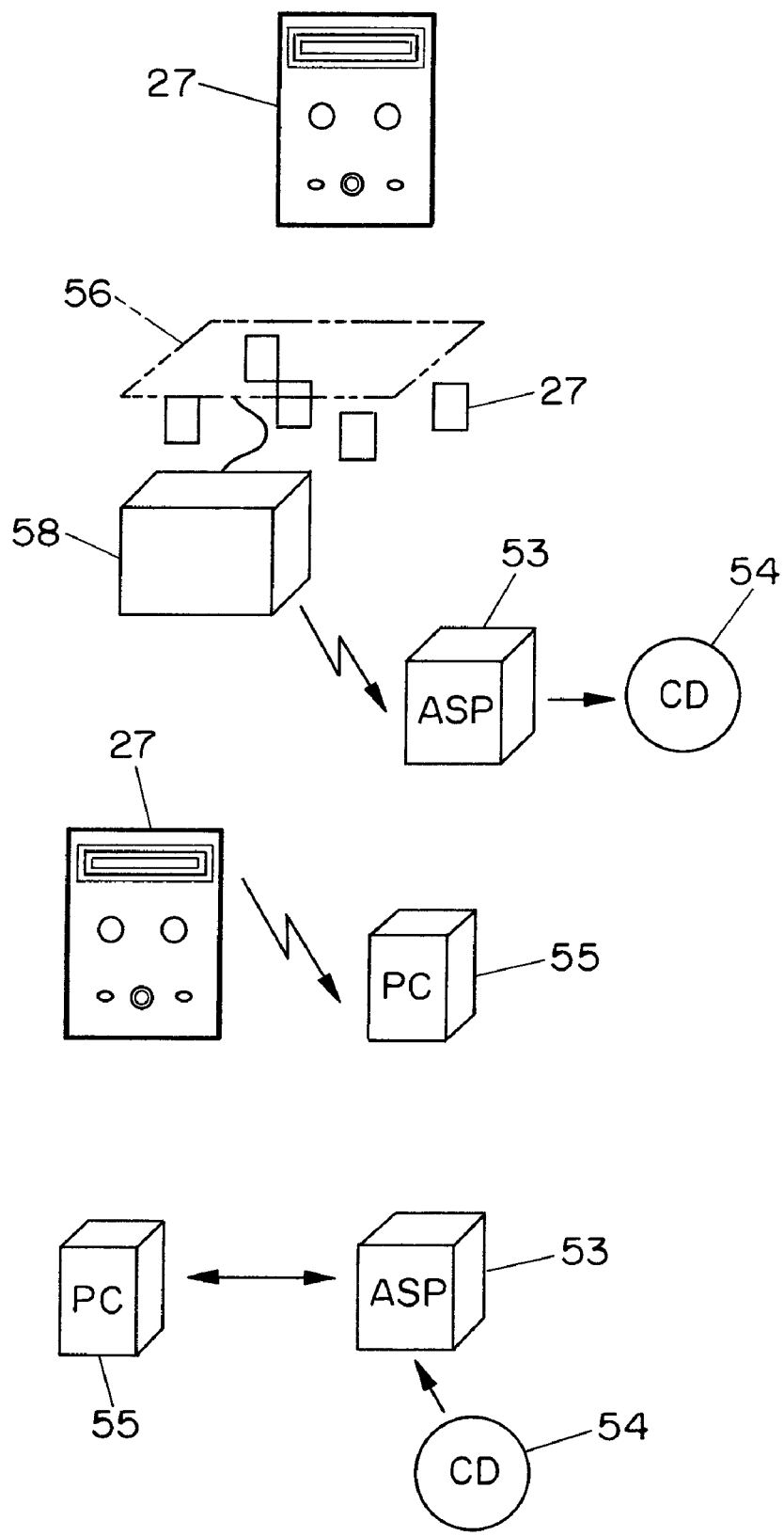
FIG. 9 is a schematic view of two arrangements for collecting auditable, authenticated event data (e.g. light levels, pressure changes, temperatures) in accordance with the invention. In the upper arrangement, event data are logged together with an algorithm-generated checksum while a checksum is calculated with the same algorithm by the ASP server on data received in real time from the RF tags. In the lower arrangement, the data log and checksum are calculated by a PC from RF tags in the repository, while a corresponding check sum is calculated remotely at the ASP server, where the data is received from the RF tags and stored on an unalterable CD-R disc.

As shown in FIG. 9, at the end of the run the tag may use an algorith to calculate and display a checksum based on the light levels (e.g. visible or infrared) experienced at the tag. The ASP can independently calculate a checksum using the same algorithm based on its permanent record of the data stored at the ASP. In the simplest form of the system, these checksums will simply be compared upon delivery to confirm that the no unauthorized intrusions into the repository have occurred. As will be understood, this data may be stored permanently on a write-once-only CD-R disk at the ASP's data storage apparatus and even archived by an independent auditor (e.g. KPMG) who would have exclusive access to the CD-R disc.

An alternative method (lower half of FIG. 9) may be to remove the tags from the freight, harvest the log contained in each tag by way of a PC it the delivery site. The PC may, of course, be connected to the ASP server via the Internet where the PC cannot, in real-time, readily compare the tag log as well as the ASP. Moreover, a report that has been independently audited can be printed on the site to confirm that the shipment is acceptable (no unauthorized intrusions or openings caused by theft or terrorism) within a few minutes after arrival.

Figure 10:
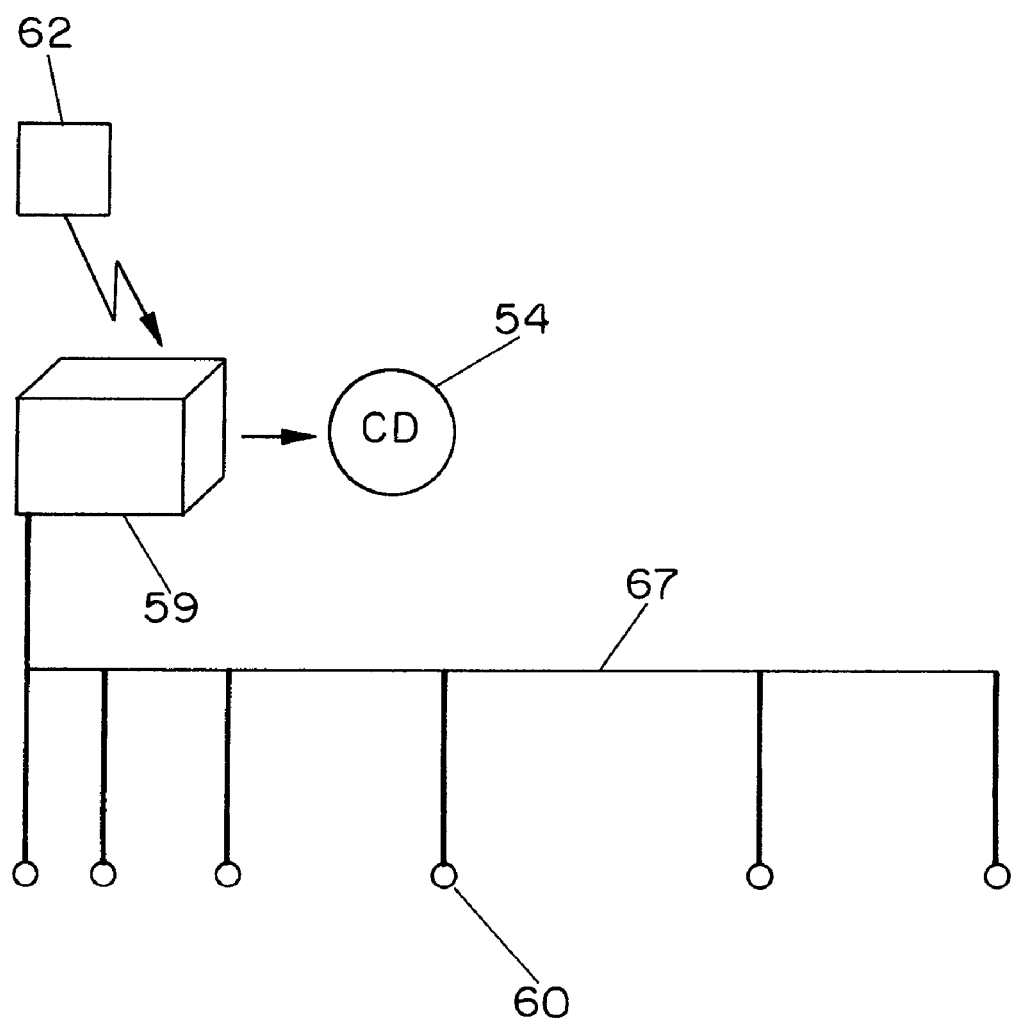
FIG. 10 is a schematic view of an Option 1 in which event data from tags attached to cargo containers or directly attached to objects disposed within a warehouse or ship and connected by cabling to a network device that receives time and/or position signals (e.g. from NIST or GPS) are stored together as a temporally ordered series on a local unalterable CD-R disc drive to which the network device is cabled within the repository.

It is also possible to record the data log of light level event data in a data storage apparatus located on the truck if a write-once-only CD-R disc is used to prevent alteration by improperly motivated individuals (see FIG. 10). In that case, care must be taken to prevent any compromise of the audit trail since the computer in the truck may be exposed to tampering before the data is recorded on the CD-R disc (e.g. by the driver or other individuals who own the shipment).

Figure 11:
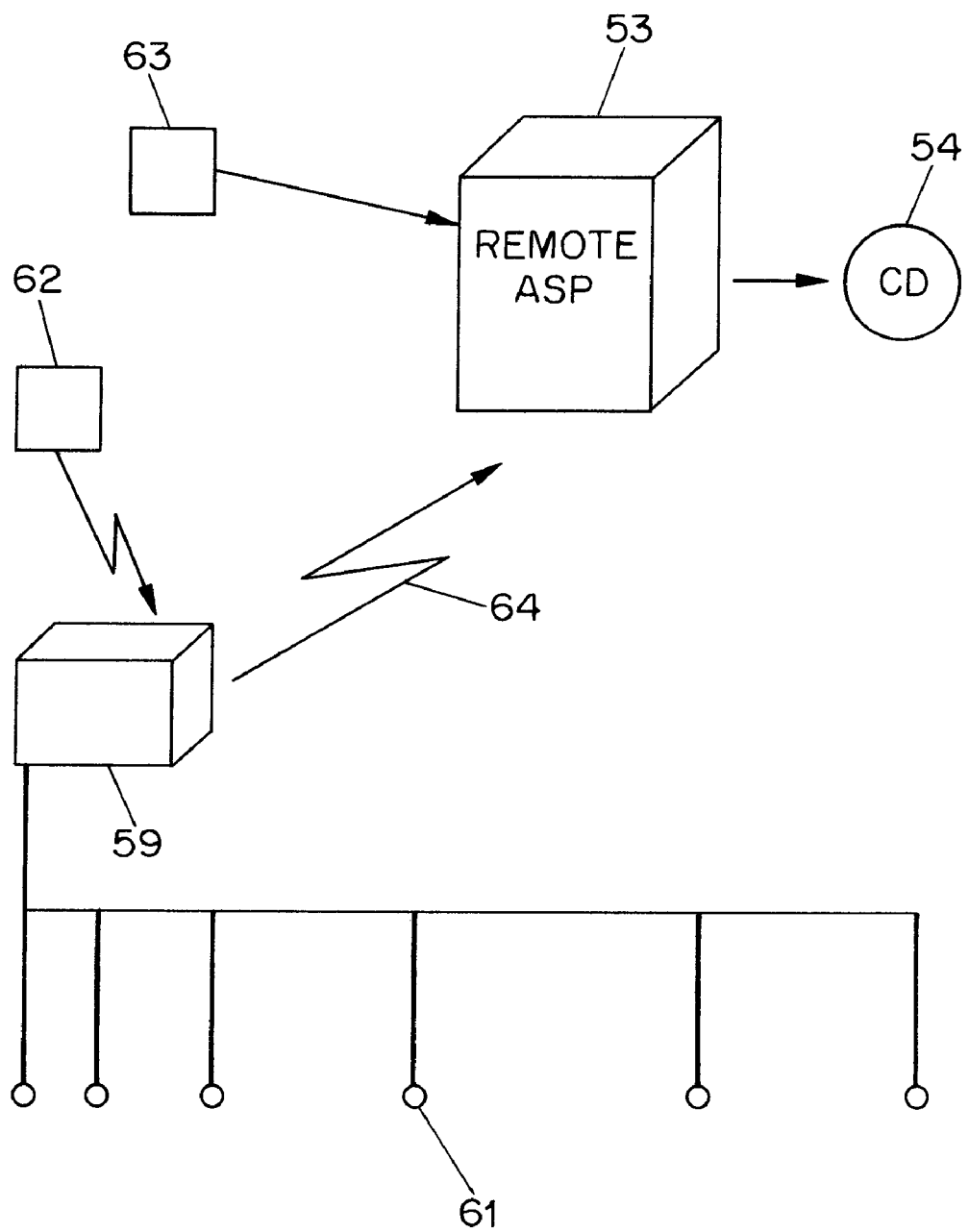
FIG. 11 is a schematic view of an Option 2 in which event data from tags attached to cargo containers or directly attached to objects disposed within a warehouse or ship and connected by cabling to a network device that receives time and/or position signals (e.g. GPS) are transmitted together wirelessly as a temporally ordered series to a remote ASP that receives NIST time data and records event and corresponding time data on an unalterable CD-R disc drive located at the remote ASP server.

FIG. 11 shows light level event data collected from an array of light sensors on security tags, attached directly to cargo containers held in a ship, warehouse, or other higher level repository, which are connected by cabling to a transceiver which receives GPS data and transmits wirelessly (e.g. via satellite) to a remote ASP for unalterable recording on a write-once-only CD on a "real time" basis.

Figure 12:
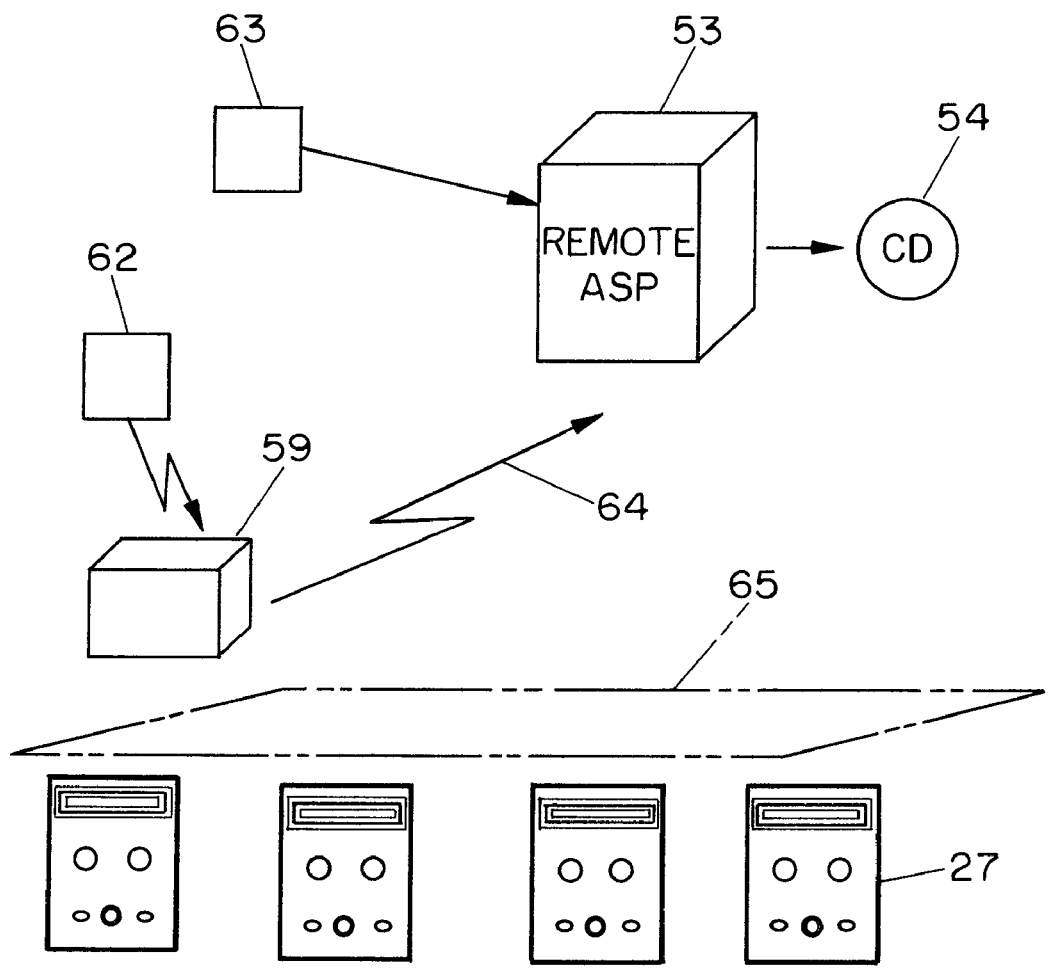
FIG. 12 is a schematic view of an Option 3 in which event data from RF tags attached to cargo containers or directly attached to objects disposed within a warehouse or ship and communicating by wireless RF to a network device that receives time and/or position signals (e.g. GPS) are transmitted together wirelessly as a temporally ordered series to a remote ASP that receives NIST time data and records event and corresponding time data on an unalterable CD-R disc drive located at the remote ASP server.

FIG. 12 shows light level event data collected from an array of light sensors on security tags, attached directly to cargo containers held in a ship, warehouse, or other higher level repository, which are connected by wireless transmission to a field antenna connected to a transceiver which receives GPS data and transmits wirelessly (e.g. via satellite) to a remote ASP for unalterable recording on a write-once-only CD on a "real time" basis.

While the present invention has been described with reference to preferred embodiments thereof, numerous obvious changes and variations may readily be made by persons skilled in the field of shipping and storage. Accordingly, the invention should be understood to include all such variations to the full extent embraced by the claims.

What is claimed is:

1. A method for creating and maintaining a record of environmental conditions to which an object in a repository is exposed as an indicator of an unauthorized intrusion comprising:
   a) sensing an environmental condition occurring within said repository;
   b) recording an unalterable event signal that defines the sensed environmental condition;

c) periodically transmitting a temporally ordered series of said event signals to a data storage apparatus, said data storage apparatus being operable to store said temporally ordered series of said event signals;

d) providing realtime access to said event signals wherein detection of a change in environmental conditions indicates an unauthorized intrusion; and e) safeguarding said data storage apparatus against alteration of said stored series of event signals.

2. A method as set forth in claim 1, wherein safeguarding step (e) is carried out by selecting the data storage apparatus for use in step c), wherein the data storage apparatus is operable to store said series of event signals upon a medium that cannot be readily altered without detection.

3. A method as set forth in claim 2, wherein said repository is a vehicle operable for delivery of said objects, and wherein said medium is a write-once-only CD-Recordable (CD-R) disc.

4. A method as set forth in claim 1, wherein safeguarding step (e) is carried out by disposing said data storage apparatus at a secure location distant from said repository.

5. A method as set forth in claim 4, wherein said safeguarding step (e) utilizes a selected algorithm to calculate a pair of checksums based on a selected sequence of event signals, said pair of checksums having a selected relationship in the event of data integrity, one of said checksums being calculated from event signals generated at said repository, the other checksum being calculated from event signals transmitted to said data storage apparatus.

6. A method as set forth in claim 4, wherein transmitting step (c) is carried out by transmitting said event signals to said data storage apparatus immediately upon recording thereof in accordance with step (b).

7. A method as set forth in claim 1, wherein safeguarding step (e) comprises storage of corresponding temporal data together with each said event signal, said temporal data being obtained from an independent source.

8. A method as set forth in claim 7, wherein said repository is a cargo container operable for delivery of said objects, wherein said medium is a write-once-only CD-Recordable (CD-R) disc, and wherein said independent source is a global positioning system (GPS) satellite.

9. A method as set forth in claim 1, wherein said sensing step (a) and recording step (b) are carried out by associating a tag with said repository, said tag comprising an event sensor operable to record said event signal for describing an event occurring within said repository, said data storage apparatus operable to store data comprising identification data for identifying said tag, said tag being operable to provide data signals comprising said event signal and an identification signal based upon said identification data, and an energy source for activating said event sensor and said data storage apparatus.

10. A method as set forth in claim 8, wherein said sensing step (a) and recording step (b) are carried out by associating a tag with said cargo container, said tag comprising an event sensor operable to record said event signal for describing said event occurring within said cargo container, the data storage apparatus operable to store data comprising identification data for identifying said tag, said tag comprising a transmitter operable to transmit data signals comprising said event signal and an identification signal based upon said identification data to said data storage apparatus, and an energy source for activating said event sensor, said transmitter and said data storage apparatus.

11. A method as set forth in claim 10, wherein said tag is attached to an outer surface of said cargo container, and wherein said event sensor comprises a photodetector disposed within said cargo container, said photodetector being operable to transmit event signals, describing a change in light levels within said cargo container based upon an unauthorized intrusion, to said data storage apparatus.

12. A method as set forth in claim 10, a plurality of said tags being disposed in different areas of said cargo container to sense different events experienced in said different areas.

13. A method as set forth in claim 10, wherein a plurality of series of said data signals from a corresponding plurality of cargo containers are transmitted wirelessly to said data storage apparatus via a communication network, said data storage apparatus being operable to store said series of event signals upon a medium that cannot be readily altered without detection.

14. A method as set forth in claim 10, said tag being a radio frequency (RF) tag, said RF tag comprising a tag transmitter and a tag antenna operable at a radio frequency of less than 1 megahertz.

15. A system for creating and maintaining a record of environmental conditions to which an object in a repository is exposed as an indicator of unauthorized intrusion comprising:

a) a tag carried by said repository, said tag comprising an environmental condition sensor operable to record an unalterable event signal for describing an environmental condition occurring within said repository, a data storage device operable to store data comprising identification data for identifying said tag, a tag transmitter operable to periodically transmit data signals comprising said event signal and provide realtime access to said event signals; and an identification signal based upon said identification data, and an energy source for activating said environmental condition sensor and said tag transmitter and said data storage device; and b) a data storage apparatus in operative communication with said tag, said data storage apparatus being operable to store a temporally ordered sequence of said event signals upon a medium which cannot be readily altered without detection.

16. A system as set forth in claim 15, and further comprising a central data processor, each tag being connected by cable to said central data processor.

17. A system as set forth in claim 15, said tag comprising a radio frequency (RF) tag attached to said repository, said system further comprising:

c) at least one field antenna disposed at an orientation and within a distance from said repository that permit effective communication with said RF tag at said radio frequency of less than 1 megahertz; and d) a reader in operative communication with said field antenna, said reader being operable to receive data signals from said RF tag.

18. A system as set forth in claim 17, said data storage apparatus being disposed at a secure location distant from said object, said system further comprising:

e) a field transmitter disposed at said repository and operable to transmit said event signals to said data storage apparatus.

19. A system as set forth in claim 17, said system comprising a pair of checking devices for utilizing a selected algorithm to calculate a corresponding pair of checksums based on a selected sequence of event signals, the pair of checksums having a selected relationship in the event of data integrity, one of said checking devices being disposed at said repository, the other checking device being disposed at said data storage apparatus.

20. A system as set forth in claim 17, said system further comprising:
   e) a geographic position sensing (GPS) detector operable to record a location signal defining a geographic position of said repository, said data storage apparatus being in operative communication with said reader and said GPS detector, said data storage apparatus being operable to store a temporally ordered sequence of said event signals and corresponding location signals upon said medium which cannot be readily altered without detection.

21. A system as set forth in claim 20, said data storage apparatus being disposed at a secure location distant from said object, said system further comprising:
   f) a field transmitter disposed at said repository and operable to transmit said event signals and corresponding location signals to said data storage apparatus.

22. A system as set forth in claim 21, said system further comprising a clock operable to generate time signals for transmittal to said data storage apparatus and for storage thereat in correspondence with said event signals.

23. A system as set forth in claim 20, said repository comprising a cargo container disposed on a movable vehicle, said movable vehicle further comprising a central data processor in operative communication with said field antenna, said tag further comprising a tag receiver operable to receive an RF interrogation signal at a RF frequency of less than 1 megahertz from said field antenna, said RF interrogation signal being operable to cause said tag to emit an event signal.

24. A system as set forth in claim 23, wherein said identification data comprises an internet protocol (IP) address, and wherein said central data processor is operable for communication with an internet router.

25. A system as set forth in claim 15, said system comprising a plurality of said low frequency RF tags and a plurality of low frequency field antennas disposed in different areas of said repository and operable to enable discrimination of event signals received from RF tags disposed in different areas.

26. A system as set forth in claim 17, said data storage apparatus comprising a write-only-once device to assure integrity of data relating to events occurring within said repository.

* * * * *

UNITED STATES PATENT AND TRADEMARK OFFICE
CERTIFICATE OF CORRECTION

PATENT NO. : 7,646,301 B2  Page 1 of 1
APPLICATION NO. : 11/275029
DATED : January 12, 2010
INVENTOR(S) : Waterhouse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this

Twenty-eighth Day of December, 2010

David J. Kappos
*Director of the United States Patent and Trademark Office*